3,631,135
INK COMPOSITION FOR IMPARTING HIGH GLOSS
TO MELAMINE RESIN ARTICLES
Patrick J. McGuire, 123 Magnolia Ave.,
Mount Vernon, N.Y. 10503
No Drawing. Continuation-in-part of application Ser. No. 707,324, Feb. 21, 1968. This application Feb. 2, 1970, Ser. No. 7,320
Int. Cl. B32b 27/42; C08b 27/14
U.S. Cl. 260—17    10 Claims

ABSTRACT OF THE DISCLOSURE

A water-soluble, high gloss ink for imparting a gloss to molded articles such as articles molded from melamine resin is obtained from compositions comprising from about 25–50 parts by weight of a synthetic pearl pigment and from about 75–50 parts by weight of a vehicle comprising water, polyvinyl alcohol and a thickening agent. Based on total composition in the liquid state, water may be present in an amount of from about 40–65 parts, the polyvinyl alcohol may be present in an amount of from about 5–20 parts, and the thickening agent may be present in an amount of from about 0.1–3 parts.

---

This application is a continuation-in-part of Ser. No. 707,324 filed Feb. 21, 1968 for the same inventor, now abandoned.

BACKGROUND OF THE INVENTION

Articles molded from melamine resins are in widespread use and are especially popular for use in dishware. Such articles are attractive, light in weight, stain and abrasion resistant and much less subject to breakage than ceramic ware. The molded article, however, does not exhibit the gloss and lustre associated with ceramic ware.

OBJECTS OF THE INVENTION

It is, accordingly, an object of the present invention to provide an aqueous high gloss ink composition. Another object is to provide a composition for imparting high gloss to articles molded from melamine resins. A further object is to provide a high gloss ink composition which may be applied to articles by a molding process. Still another object is to provide a method for imparting high gloss to articles molded from melamine resins. These and other objects of the present invention will be apparent from the following description.

SUMMARY OF THE INVENTION

It has now been found that aqueous high gloss ink compositions are obtained from compositions comprising from about 40 parts by weight to about 65 parts by weight water, from about 25 parts by weight to about 50 parts by weight pigment, from about 5 parts by weight to about 20 parts by weight of polyvinyl alcohol, and from about 0.1 part by weight to about 3 parts by weight of a thickening agent.

DETAILED DESCRIPTION

In general, any synthetic pearl pigment may be used provided it is water dispersible. Such pigments are well known to those skilled in the art. An example of such a pigment, and its preparation are disclosed in U.S. Patent No. 1,546,309. Other suitable pigments include compounds of bismuth and of lead. The compositions of the present invention may contain from about 25 parts by weight to about 50 parts by weight of a synthetic pearl pigment, preferably from about 30 parts to about 40 parts by weight, and most preferably from about 34 parts by weight to about 38 parts by weight.

Polyvinyl alcohol is manufactured by hydrolyzing polyvinyl acetate and the degree of hydrolysis is of critical importance because the water solubility of polyvinyl alcohol is primarily a function of the degree of hydrolysis. The preferred range of hydrolysis for the resins to be used in the glitter paints of this invention is 85 to 91% with about 88% optimum. Strangely, the water solubility of hydrolyzed polyvinyl acetate is not a straight line but a curve and about 88% hydrolysis provides maximum water solubility. The specified range is not absolutely critical because the increase and decrease in water solubility with increasing hydrolysis is gradual, and slightly less water solubility may be acceptable for some products and some purposes. However, the range of substantially 85 to 91 or 92% is particularly recommended.

The polyvinyl alcohol may be present in an amount of from about 5 parts by weight to about 20 parts by weight, and preferably from about 7 parts by weight to about 15 parts by weight. Other materials may be present in minor amounts to modify the polyvinyl alcohol. The modifier should be water dispersible. An example of such a modifier is polyvinyl acetate.

The thickening agent of the present invention should also be water soluble and is preferably sodium carboxymethyl cellulose. Other thickening agents which may be used are, for example, starch, dextrin, casein, and sodium polyacrylate. The thickening agent may be present in an amount from about 0.1 part by weight to about 3 parts by weight.

The compositions of the present invention may be applied to decorated or undecorated articles molded from melamine resins. The compositions have excellent film continuity and release readily from the mold. They are fast drying and do not require any catalyst. The compositions of the present invention have good abrasion resistance and may be used with or without pigments. They can be applied to articles by molding and do not stain the mold or transfer ink to the mold.

The following examples illustrate the present invention without, however, limiting the same thereto.

EXAMPLE

(A) Preparation of ink

To 84 parts by weight of water there were added 15 parts by weight of polyvinyl alcohol (89% hydrolyzed) and 1 part by weight of sodium carboxymethyl cellulose. 64 parts by weight of the foregoing mixture were added to 36 parts by weight of synthetic pearl pigment. The resulting composition was mixed until uniform.

(B) Application of gloss ink

The foregoing composition was silk screened on foils used to decorate molded articles formed from melamine resins. (The foil is a sheet of overlay paper impregnated with melamine resin. A decorative design has been applied to the paper.) The silk screened foil was placed on a dinner place molded from melamine resin. The particular resin used in this example was a hexy-methoxy methyl melamine resin. The plate had a typical dull finish. The foil was placed so that the ink composition was on top. The decoration was applied to the plate by the usual molding cycle lasting 40 seconds. The decorated plate then was removed from the mold. It released readily from the mold with no adhesion and exhibited high gloss and lustre.

COMPARATIVE EXAMPLE

Procedure B above was repeated except that no ink composition had been silk screened on the foil. When removed from the mold the decorated plate lacked a glossy finish and was greatly inferior in appearance to the plate prepared in the previous example.

It is to be understood that while the invention has been described in detail, variations and modifications may be made without departing from the invention as defined in the appended claims.

What I claim is:

1. An aqueous high gloss liquid ink composition comprising from about 40 parts by weight to about 65 parts by weight water, from about 25 parts by weight to about 50 parts by weight of a synthetic pearl pigment, from about 5 parts by weight to about 20 parts by weight of polyvinyl alcohol formed by hydrolyzing a polyvinyl acetate to a degree of about from 85% to 92% and from about 0.1 part by weight to about 30 parts by weight of a water miscible thickening agent selected from the group consisting of sodium carboxymethyl cellulose, starch, dextrin, casein, and sodium polyacrylate.

2. A composition according to claim 1 wherein the pigment is present in an amount of from about 30 parts by weight to about 40 parts by weight, and wherein the polyvinyl alcohol is present in an amount of from about 7 parts by weight to about 15 parts by weight.

3. A composition according to claim 2 wherein the pigment is present in an amount from about 34 parts by weight to about 38 parts by weight.

4. A composition according to claim 3 wherein the thickening agent is sodium carboxymethyl cellulose.

5. An article molded from melamine resin and coated with a composition comprising from about 25 parts by weight to about 50 parts by weight of a synthetic pearl pigment, from about 5 parts by weight to about 20 parts by weight of polyvinyl alcohol formed by hydrolyzing a polyvinyl acetate to a degree of about from 85% to 92% and from about 0.1 part by weight to about 3 parts by weight of a water miscible thickening agent selected from the group of sodium carboxymethyl cellulose, starch, dextrin, casein, and sodium polyacrylate.

6. An article according to claim 5 wherein the pigment is present in an amount of from about 30 parts by weight to about 40 parts by weight, and wherein the polyvinyl alcohol is present in an amount of from about 7 parts by weight to about 15 parts by weight, and wherein the thickening agent is sodium carboxymethyl cellulose.

7. An article according to claim 6 wherein the pigment is present in an amount of from about 34 parts by weight to about 38 parts by weight.

8. A method of imparting high gloss to articles molded from melamine resins which comprises applying to the article a composition comprising from about 40 parts by weight to about 50 parts by weight of a synthetic pearl pigment, from about 5 parts by weight to about 20 parts by weight of polyvinyl alcohol, formed by hydrolyzing a polyvinyl acetate to a degree of about from 85% to 92% and from about 0.1 part by weight to about 3 parts by weight of a water miscible thickening agent selected from the group consisting of sodium carboxymethyl cellulose, starch, dextrin, casein, and polyacrylate, and drying the composition on the article.

9. A method according to claim 8 wherein the pigment is present in an amount of from about 30 parts by weight to about 40 parts by weight, and wherein the polyvinyl alcohol is present in an amount of from about 7 parts by weight to about 15 parts by weight, and wherein the thickening agent is sodium carboxymethyl cellulose.

10. A method according to claim 9 wherein the pigment is present in an amount of from about 34 parts by weight to about 38 parts by weight.

References Cited

UNITED STATES PATENTS 3,047,532   7/1962   D'Alelio _____ 260—856

WILLIAM H. SHORT, Primary Examiner

E. WOODBERRY, Assistant Examiner

U.S. Cl. X.R.

117—138.8 G, 155, 161 UHE; 260—8, 17.4 ST, 29.6 B, 41 B